(12) United States Patent
Hoshii

(10) Patent No.: US 7,912,367 B2
(45) Date of Patent: Mar. 22, 2011

(54) IMAGE PROCESSING SYSTEM

(75) Inventor: Jun Hoshii, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 12/354,459

(22) Filed: Jan. 15, 2009

(65) Prior Publication Data

US 2009/0122324 A1    May 14, 2009

Related U.S. Application Data

(63) Continuation of application No. 11/369,731, filed on Mar. 8, 2006, now Pat. No. 7,490,917.

(30) Foreign Application Priority Data

Mar. 9, 2005  (JP) .................................. 2005-65773
Feb. 15, 2006 (JP) .................................. 2006-37673

(51) Int. Cl.
*G03B 17/20* (2006.01)
*G03B 17/24* (2006.01)
*G03B 19/00* (2006.01)

(52) U.S. Cl. ...................... 396/296; 396/211; 396/429
(58) Field of Classification Search .................. 396/147, 396/296; 348/346
See application file for complete search history.

(56) References Cited

U.S. PATENT DOCUMENTS

| | | | | |
|---|---|---|---|---|
| 4,011,571 | A * | 3/1977 | Okuzawa | 396/291 |
| 5,664,235 | A * | 9/1997 | Ohmura et al. | 396/71 |
| 5,873,007 | A * | 2/1999 | Suarez et al. | 396/296 |
| 6,806,906 | B1 * | 10/2004 | Soga et al. | 348/333.03 |
| 7,274,400 | B2 * | 9/2007 | Hyodo et al. | 348/333.02 |
| 2004/0174455 | A1 * | 9/2004 | Soga | 348/348 |
| 2005/0036709 | A1 | 2/2005 | Imai | |
| 2005/0057765 | A1 | 3/2005 | Fujita et al. | |
| 2005/0063015 | A1 | 3/2005 | Kakutani | |

FOREIGN PATENT DOCUMENTS

JP    11-348322 A    12/1999

* cited by examiner

*Primary Examiner* — W. B. Perkey
(74) *Attorney, Agent, or Firm* — Sughrue Mion, PLLC

(57) ABSTRACT

The table 200 represents that only small dots should be formed in the range Cd1 of relatively small tone values. In the range Cd2, the production rate of small dots gradually decreases, while the production rate of medium dots increases. In the range Cd3, the production rate of small dots and medium decreases, while the production rate of large dots increases. Consequently, small dots, medium dots, and large dots are intermingled, with the proportion of large dots increasing in association with higher tone values. According to the present invention, printing is able to be implemented while switching among dot apportionment tables depending on the object represented in one set of image data, and printing using small dots is able to be implemented efficiently in areas where low grainy appearance is required, namely areas corresponding to human faces.

7 Claims, 15 Drawing Sheets

Fig.11

| PIXEL LOCATION | FACE RECOGNITION FLAG | DOT APPORTIONMENT TABLE NUMBER |
|---|---|---|
| (X1,Y1) | 0 | 1 |
| (X2,Y1) | 0 | 1 |
| (X3,Y1) | 0 | 1 |
| ⋮ | ⋮ | ⋮ |
| (X4,Y4) | 0 | 1 |
| (X5,Y4) | 1 | 2 |
| (X6,Y4) | 1 | 2 |
| (X7,Y4) | 1 | 2 |
| ⋮ | ⋮ | ⋮ |
| (X7,Y7) | 1 | 2 |
| (X8,Y7) | 1 | 2 |
| (X9,Y7) | 0 | 1 |
| ⋮ | ⋮ | ⋮ |
| (X8,Y10) | 0 | 1 |
| (X9,Y10) | 0 | 1 |
| (X10,Y10) | 0 | 1 |

300

IMAGE PROCESSING SYSTEM

This is a continuation of application Ser. No. 11/369,731 filed Mar. 8, 2006. The entire disclosure of the prior application, application Ser. No. 11/369,731 is hereby incorporated by reference.

BACKGROUND OF THE INVENTION

1. Field of the Invention

The present invention relates to a printer that implements printing by ejecting dots of two different types differing in dot diameter onto a printing medium.

2. Description of the Related Art

In recent years, printers of ink-jet format (called ink-jet printers) that print of images by ejecting ink drops of differing amounts of ink have come into widespread use. An ink jet printer has a plurality of dot apportionment tables that set the dot production rate. In a dot apportionment table, production rate of dots of differing dot diameter is set according to tone value. The ink-jet printer will select a dot apportionment table according to the print mode, e.g. the resolution, for use in printing.

However, in order to the reduce the occurrence of white stripes (known as "banding") in printed images, conventional ink-jet printers are set to frequently use of dot apportionment tables that use large numbers of large-diameter dots, irrespective of the content of the particular image represented by the image data. A resultant problem is that flesh colors, e.g. human faces, which are required to have minimal grainy appearance (i.e. low graininess), are also reproduced with large-diameter dots, thus exacerbating graininess of flesh colors.

Also, with conventional ink-jet printers, only a single dot apportionment table was able to be selected for a printing mode. Thus, it was not possible to print while switching among suitable dot apportionment tables according to the content of the image, e.g. objects such as people or landscapes.

SUMMARY OF THE INVENTION

The present invention was created considering the problems described above, and its purpose is to improve the quality of printed images by executing printing with dot diameter depending on the particular subject which is represented by image data.

In order to address this issue at least in part, a first aspect of the invention provides a printer having at least two types of ink, and heads, wherein each of the heads is capable of forming two more types of dots of different diameter on a print medium, for each of the inks. The printer in the first aspect of the invention comprises: image data obtaining module that obtains image data representing an image for printing; image analyzing module that analyzes the obtained image data; table obtaining module that obtains at least two dot apportionment tables on the basis of the analysis result of the image data, wherein the dot apportionment tables set the production volume of each of the dot types; and printing module that prints the image by forming dots on the print medium while switching among the dot apportionment tables, depending on the analysis result.

The printer in the first aspect of the invention is able to print while switching between the dot apportionment tables in accordance with the analysis result of the image. Consequently, even where regions requiring the use of many small-diameter dots and regions requiring the use of many large-diameter dots are intermingled in the image data, each of the regions is able to be printed with an appropriate dot apportionment table, and the occurrence of banding and graininess are able to be suppressed. Thus, the quality of the picture printed on a medium is able to be improved.

A second aspect of the invention provides a printer has at least two types of ink, wherein the at least two types of ink include dark ink and light ink of the same color. The printer in the second aspect of the invention comprises: image data obtaining module that obtains image data representing an image for printing; image analyzing module that analyzes the obtained image data; table obtaining module that obtains at least two dark/light ink apportionment tables, wherein the at least two dark/light ink apportionment tables set usage volume of the dark ink and the light ink, based on the analysis result of the image data; and printing module that prints the image by forming dots while switching among the dark/light ink apportionment tables, depending on the analysis result.

The printer in the second aspect of the invention is able to print while switching between the dark/light ink apportionment tables in accordance with the analysis result of the image. Consequently, even where regions requiring the use of much dark ink and regions requiring the use of much light ink are intermingled in the image data, each of the regions is able to be printed with an appropriate dark/light ink apportionment table, and the occurrence of banding and graininess are able to be suppressed. Thus, the quality of the picture printed on a medium is able to be improved.

A third aspect of the invention provides a printing method implemented by a printer, wherein the printer has at least two types of ink, and heads, wherein each of the heads is capable of forming two more types of dots of different diameter on a print medium, for each of the inks. The printing method in the third aspect of the invention comprises: obtaining image data representing an image for printing; analyzing the obtained image data; obtaining at least two dot apportionment tables on the basis of the analysis result of the image data, wherein the dot apportionment tables set the production volume of each of the dot types; and printing the image by forming dots while switching among the dot apportionment tables depending on the analysis result.

The printing method in the third aspect of the invention is able to provides a same action and effect as the printer in the first aspect of the invention; and the printing method in the third aspect of the invention is also able to be realized in a variety of ways in the same manner as the printer in the first aspect of the invention.

A fourth aspect of the invention provides a printing method implemented by a printer, wherein the printer has at least two types of ink that include dark ink and light ink of the same color. The printing method in the fourth aspect of the invention comprises: obtaining image data representing an image for printing analyzing the obtained image data; obtaining at least two dark/light ink apportionment tables, wherein the at least two dark/light ink apportionment tables set usage volume of the dark ink and the light ink, based on the analysis result of the image data; and printing the image by forming dots while switching among the dark/light ink apportionment tables, depending on the analysis result.

The printing method in the fourth aspect of the invention is able to provide a same action and effect as the printer in the second aspect of the invention; and the printing method in the fourth aspect of the invention is also able to be realized in a variety of ways in the same manner as the printer in the second aspect of the invention.

The method pertaining to the third aspect or the fourth aspect of the invention may also be realized in the form of a recording medium having a program recorded thereon in a computer-readable fashion.

BRIEF DESCRIPTION OF THE DRAWINGS

FIG. 11 illustrates a pixel table in the first Embodiment;

DESCRIPTION OF THE PREFERRED EMBODIMENT

The following description of the embodiments of the invention makes reference to the accompanying drawings.

A. First Embodiment

A1. System Arrangement

Figure 1A:
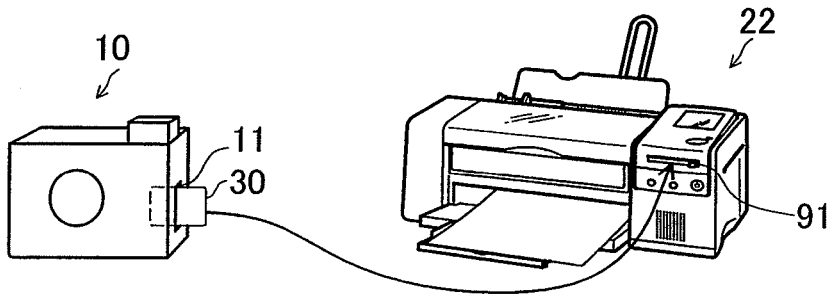
FIG. 1A exemplary illustrates a printing system in the first Embodiment.
Figure 1B:
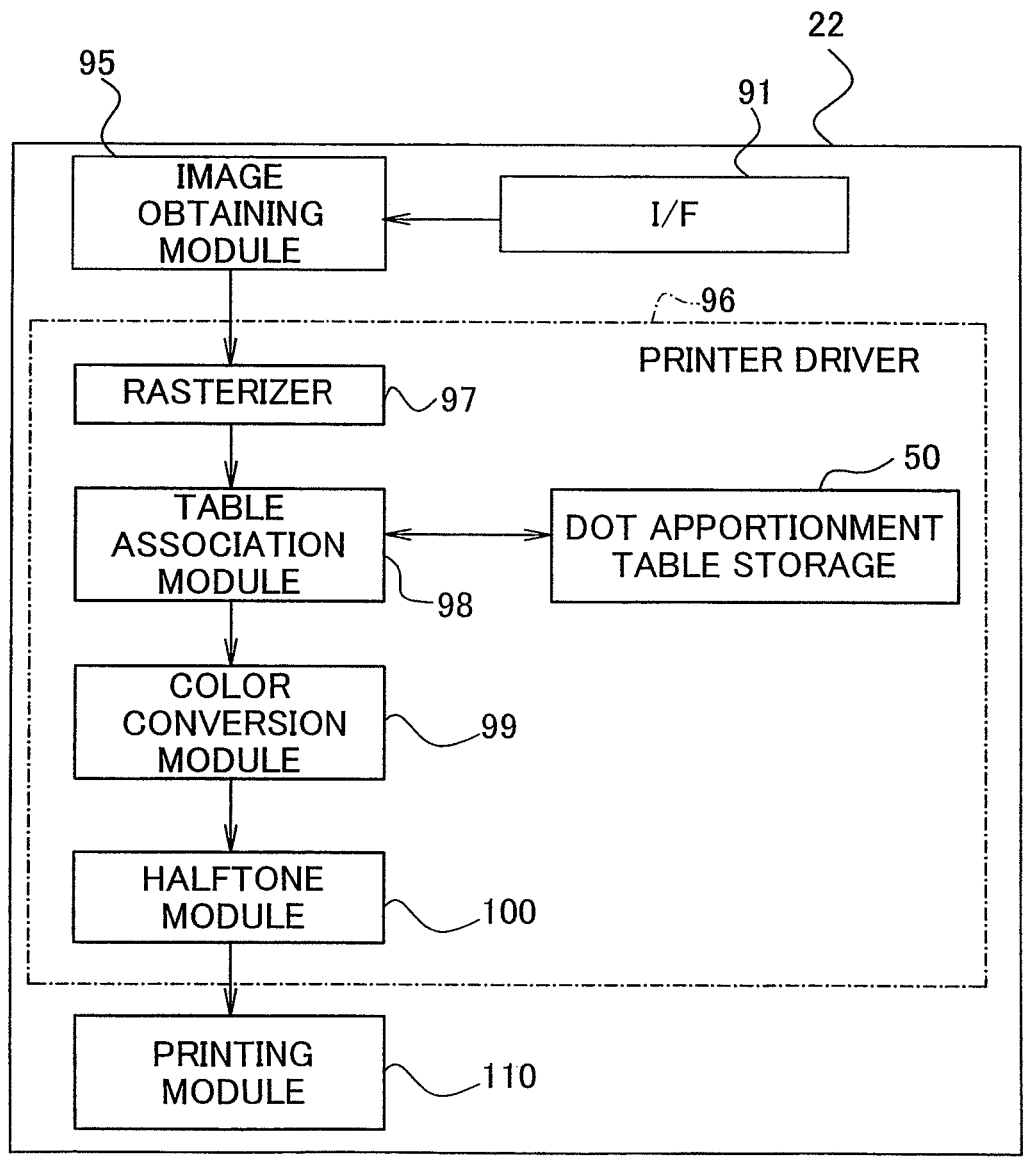
FIG. 1B exemplary illustrates functional modules of the printer in the first Embodiment.
Figure 2:
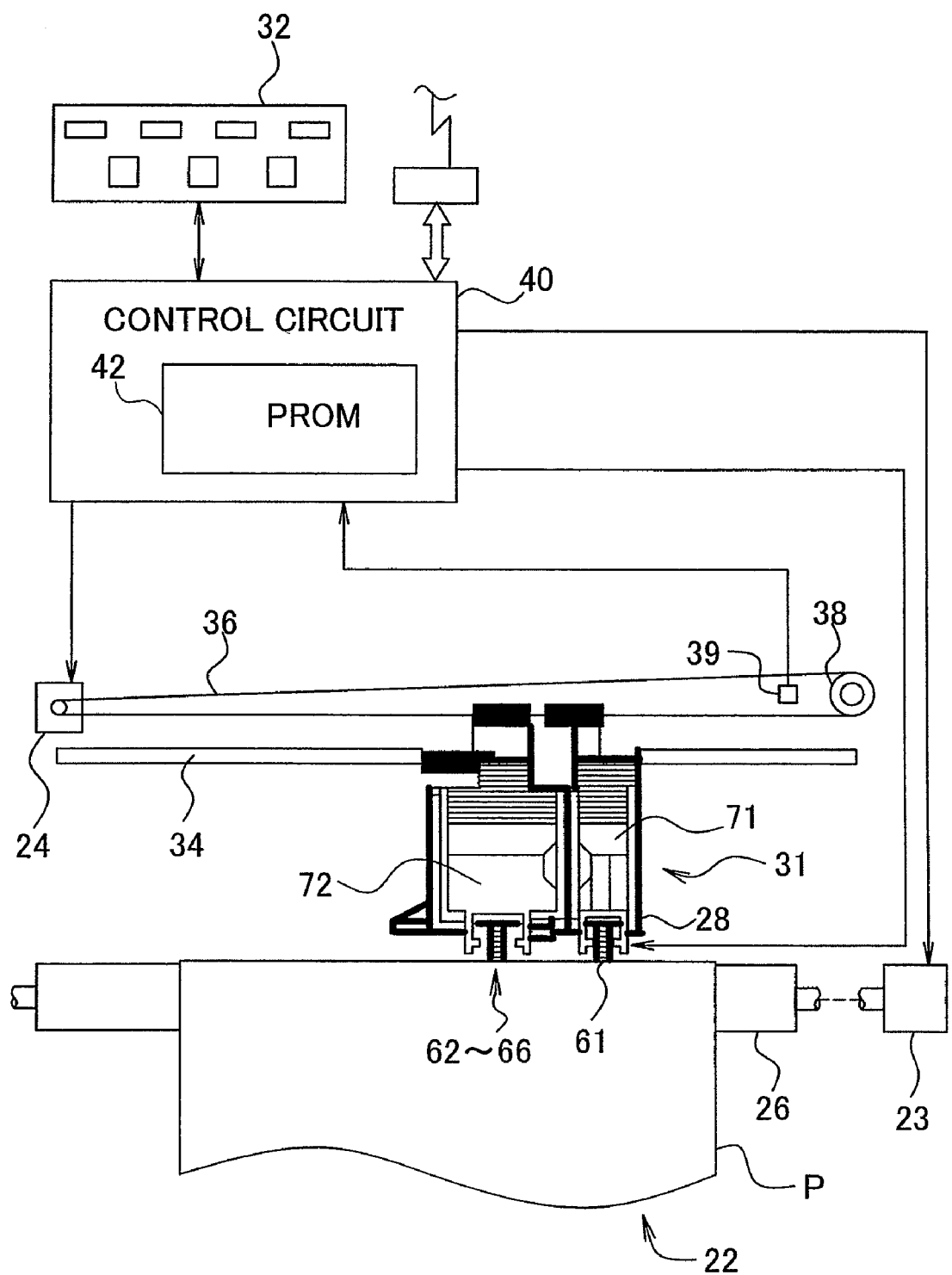
FIG. 2 exemplary illustrates the printing mechanism of the printer in the first Embodiment.

FIG. 1A exemplary illustrates a printing system in the first Embodiment. FIG. 1B exemplary illustrates functional modules of a printer in the first Embodiment. FIG. 2 exemplary illustrates the printing mechanism of the printer in the first Embodiment. A printer 22 obtains image data from a digital camera 10 through the agency of a memory card 30. In order to represent multiple tones, the printer 22 prints through selective production rate of large, medium, and small dots with different amounts of ink, that is, three types of dots of different diameter.

An image obtaining module 95 obtains image data from the memory card 30 via an interface 91, and hands the data off to a printer driver 96. The printer driver 96 converts the image data received from the image obtaining module 95, into a signal that is printable by a printing module 110.

The printer driver 96 has a rasterizer 97, a table association module 98, a dot apportionment table storage 50, a color conversion module 99, and a halftone module 100. The rasterizer 97 converts the image data received from the image obtaining module 95 into image data in dot units (hereinafter termed pixels).

The dot apportionment table storage 50 stores a plurality of dot apportionment tables. A dot apportionment table refers to a table that establishes production rate of large, medium, and small dots of different dot diameter. The table association module 98 analyzes image data, recognizes an object represented by the image data, obtains from the dot apportionment table storage 50 a dot apportionment table appropriate to the object, and associates it with the pixels composing the object.

The color conversion module 99 converts image data represented in the RGB color space to the CMYK color space used by the printer 22. The halftone module 100 implements a so-called half-toning process whereby density in a certain area is represented by means of the dot on-off state of each pixel, while switching among the different dot diameters on the basis of the dot apportionment table associated by the table association module 98.

FIG. 2 exemplary illustrates the printing mechanism of the printer in the first Embodiment. As shown in the FIG. 2, the printer 22 comprises a mechanism for conveying paper P by means of a paper feed motor 23; a mechanism for reciprocating a carriage 31 in the axial direction of a platen 26 by means of a carriage motor 24; a mechanism for driving a print head 28 carried on the carriage 31, to control ejection of ink and to formation; and a control circuit 40 for controlling the sending and receiving of signals to and from the paper feed motor 23, the carriage motor 24, the print head 28, and a control panel 32.

In the carriage 31 of the printer 22 are installed a black ink (Bk) cartridge 71 and a color ink cartridge 72 containing ink of the six colors cyan (C1), light cyan (C2), magenta (M1), light magenta (M2), and yellow (Y). For the two colors cyan and magenta, two types of ink, i.e. light and dark, are provided. In the print head 28 in the lower part of the carriage 31 there are formed a total of six ink ejection heads 61-66. At the bottom of the carriage 31 there is disposed a conduit 67 (see FIG. 3) for introducing ink from ink tanks into the head for each color. When the black ink (Bk) cartridge 71 and the color ink cartridge 72 are installed from above, the conduit 67 inserts into a connection hole provided to each cartridge, making it possible for ink to be supplied from the ink cartridges to the ink ejection heads 61-66.

Figure 3:
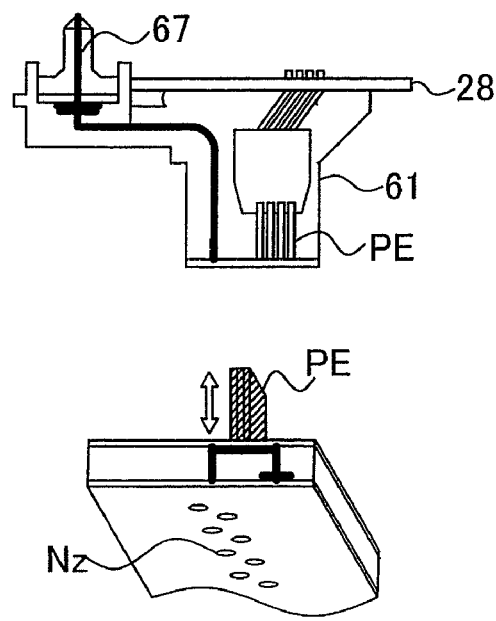
FIG. 3 schematically illustrates a structure within the print head in the first Embodiment.

The following brief description of the mechanism for ejecting ink makes reference to FIG. 3. FIG. 3 illustrates an arrangement within the print head 28 in the first Embodiment. When the cartridge 71 and the color ink cartridge 72 are installed in the carriage 31, the ink inside the ink cartridges is suctioned out through the conduit 67 and into the color ink ejection heads 61-66 of the print head 28 disposed the lower part of the carriage 31. The color ink ejection heads 61-66 are provided with 32 nozzles Nz for each color, with a piezo element PE being disposed in each nozzle.

Figure 4:
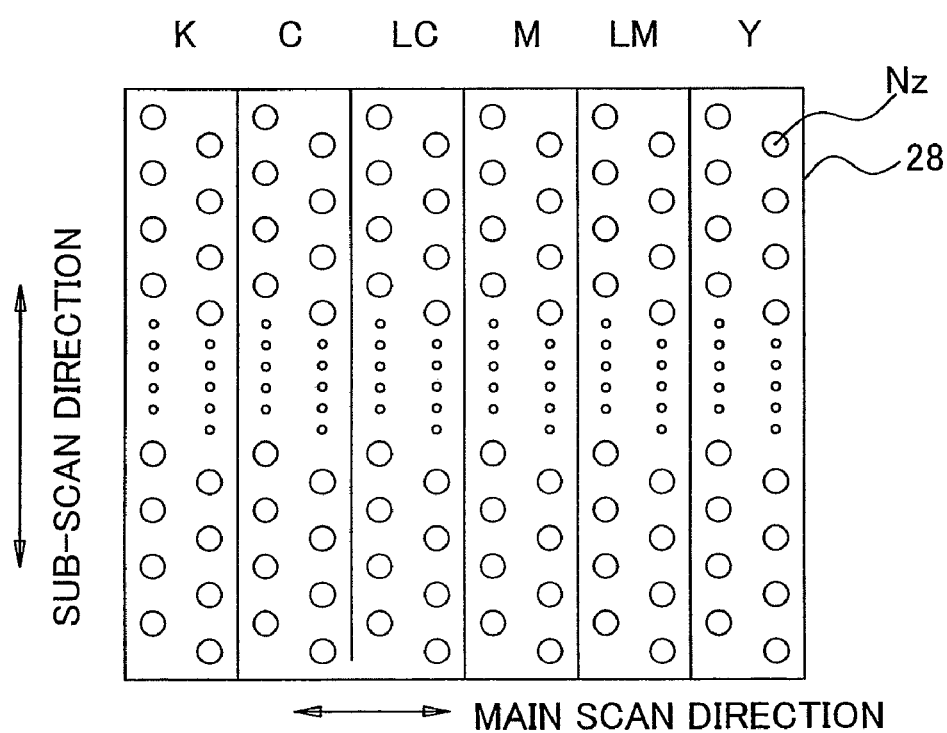
FIG. 4 illustrates an array of ink-jet nozzles in the ink ejection heads in the first Embodiment.

The following description of the array of the nozzles Nz refers to FIG. 4. FIG. 4 is an illustration depicting the array of ink-jet nozzles Nz in the ink ejection heads 61-66 in the first Embodiment. By varying the voltage, the print head 28 of the printer 22 produces dots of different dot diameter, using the nozzles Nz which all have the same diameter. The 32 nozzles Nz provided for each color are arrayed in a staggered pattern at a given nozzle pitch.

The printer 22 having the arrangement described above produces multicolor images on the paper P by reciprocating the carriage 31 by means of the carriage motor 24 while [advancing] the paper P through rotation of the platen 26 and another roller by means of the paper feed motor 23, and at the same time driving the piezo elements PE of the color ink ejection heads 61-66 to eject of each color ink, to form dots.

A2. Dot Apportionment Tables

Figure 5A:
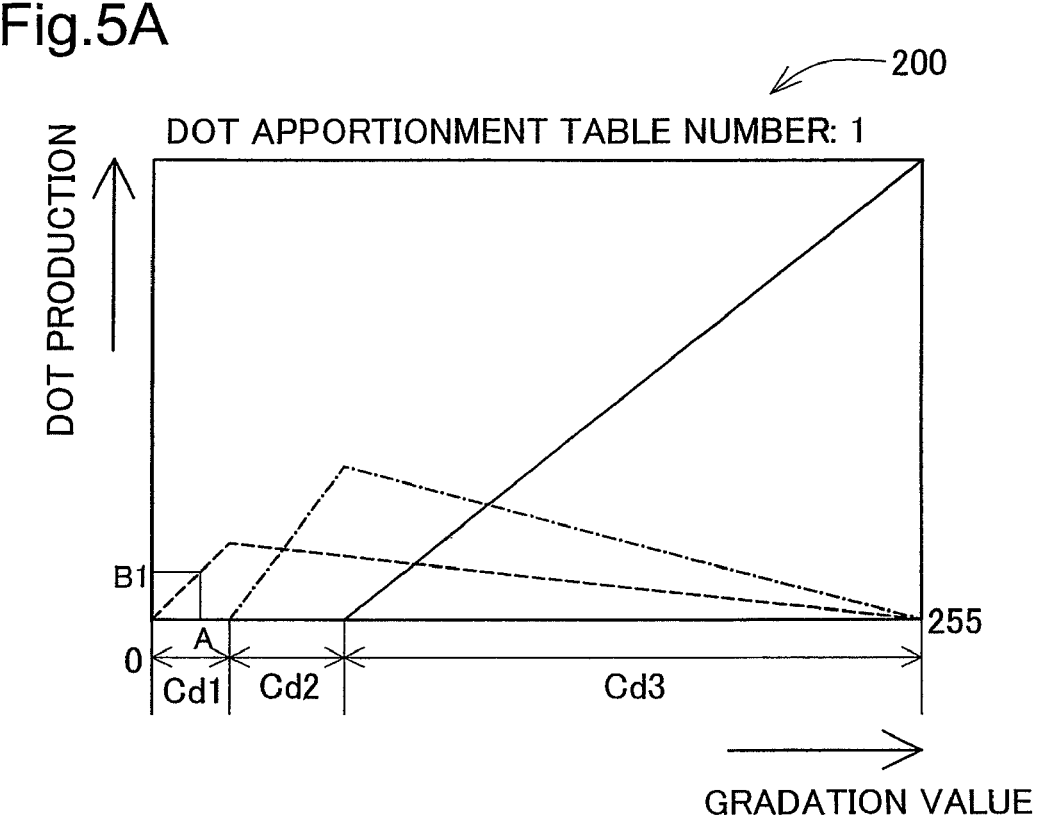
FIG. 5A and FIG. 5B illustrate contents of dot apportionment tables in the first Embodiment.
Figure 5B:
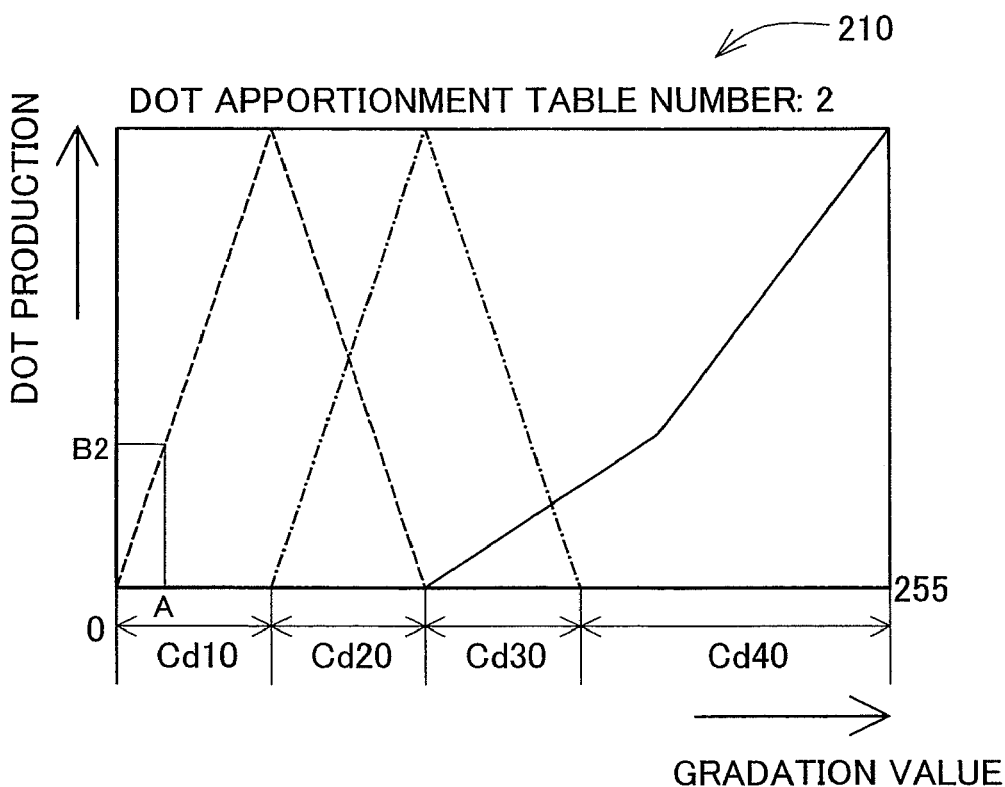

The dot apportionment tables will be described below with reference to FIGS. 5A and 5B. FIG. 5A and FIG. 5B illustrate content of dot apportionment tables in the first Embodiment. The dot apportionment table storage 50 stores 20 dot apportionment tables; dot apportionment table 200 (FIG. 5A) and dot apportionment table 210 (FIG. 5B) are an example of the dot apportionment tables stored in the dot apportionment table storage 50. The dot apportionment tables 200 and 210 represent, for cyan (C1) ink, the production rate of each dot type, which varies depending on tone value. Smalls dots are represented by the broken lines, medium dots by the dot-and-dash lines, and large dots by the solid lines. Each dot apportionment table is assigned a dot apportionment table number that uniquely identifies the dot apportionment table. The dot apportionment table 200 is assigned the apportionment table number "1" and the dot apportionment table 201 is assigned the apportionment table number "2."

The dot apportionment table 200 represents the fact that, in the range Cd1 of relatively small tone values, only small dots should be formed. That is, in the range Cd1, the production rate of medium dots and large dots are both 0, and no medium dots or large dots are formed. Even for small dots, the production rate is shown as being low. In the range Cd2, the production rate of small dots decreases gradually, and the production rate of medium dots increases. That is, both small dots and medium dots are interspersed, with the medium dots outnumbering the small dots at higher tone values. In the range Cd2, the production rate of large dots remains at 0, and no large dots are formed. In the range Cd3, the production rate of small dots and medium dots decline, and the production rate of large dots increases. That is, small, medium, and large dots are interspersed, with more large dots being formed at higher tone values. The dot apportionment table 200 represents the fact that printing should be implemented producing more large dots, during the printing process of the associated object.

The dot apportionment table 210 represents the fact that, in the range Cd10 of relatively small tone values, only small dots should be formed. That is, in the range Cd10, the production rate of medium dots and large dots are both 0, and no medium dots or large dots are formed. The small dot production rate is represented as being high, that is, that a large number of small dots are ejected. In the range Cd20, the production rate of small dots decreases gradually, and the production rate of medium dots increases. That is, both small dots and medium dots are interspersed, with the medium dots outnumbering the small dots at higher tone values. In the range Cd20, the production rate of large dots remains at 0, and no large dots are formed. At the end of the range Cd20, the production rate of small dots goes to 0, and at tone values greater than the tone values of the range Cd20, no small dots are produced. In the range Cd30, the production rate of medium dots decreases gradually, and the production rate of large dots increases. That is, both medium dots and large dots are interspersed, with the large dots outnumbering the medium dots at higher tone values. At the end of the range Cd30, the production rate of medium dots goes to 0, and at tone values greater than the tone values of the range Cd30, no medium dots are produced. In the range Cd40, only large dots are produced.

As shown in FIG. 5A and FIG. 5B, the production rate of small dots differs between B1 and B2 for the same given tone value A. That is, the dot apportionment table 210 represents a higher production rate of small dots during the printing process of the associated object.

A3. Printing Process

Figure 6:
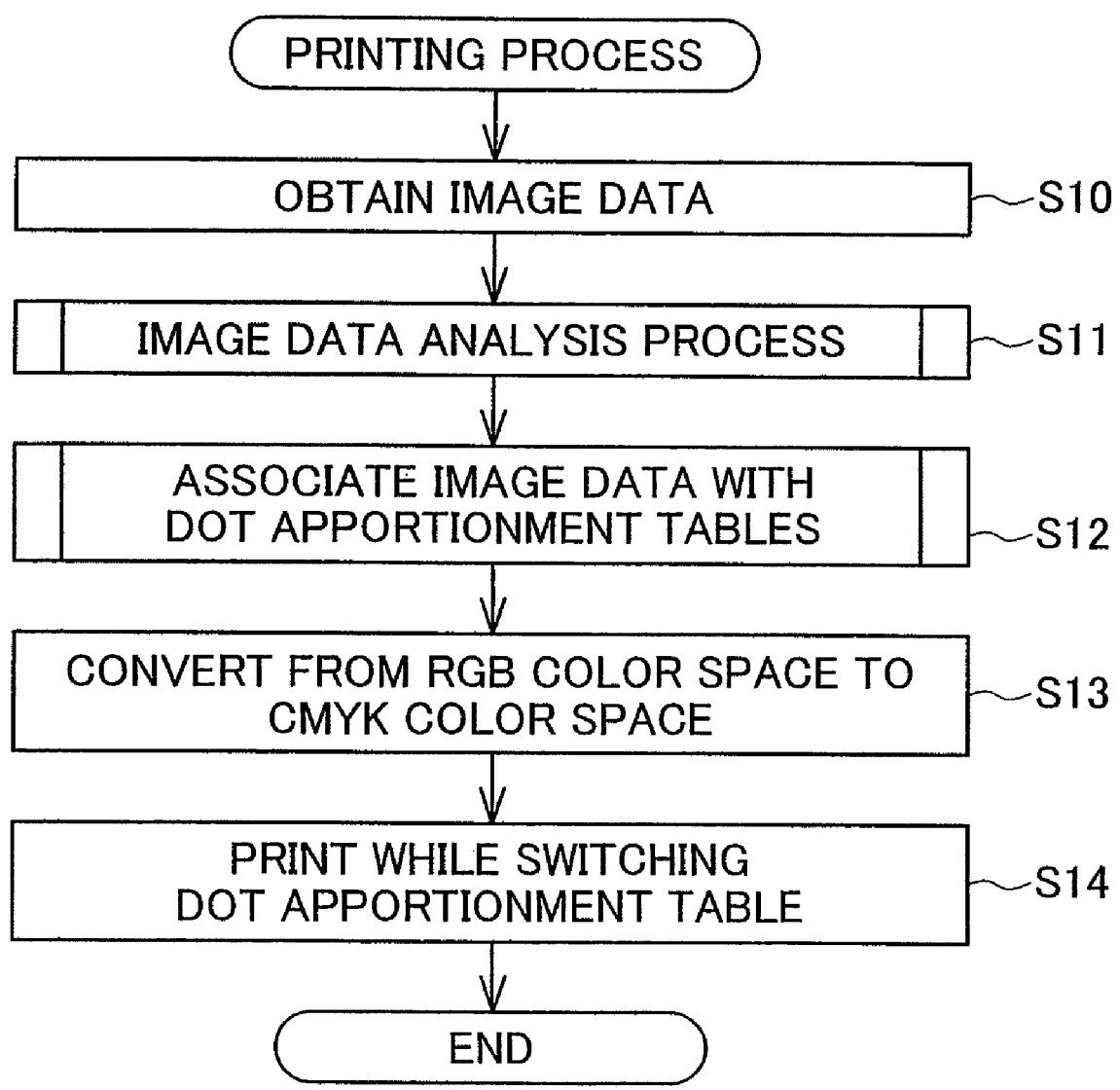
FIG. 6 shows a flowchart of the printing process in the first Embodiment.

The following description of the printing process in the first Embodiment makes reference to FIG. 6 to FIG. 11. FIG. 6 shows a flowchart of the printing process in the first Embodiment. The printer 22 obtains image data (Step S10), and analyzes the obtained image data (Step S11).

Figure 7:
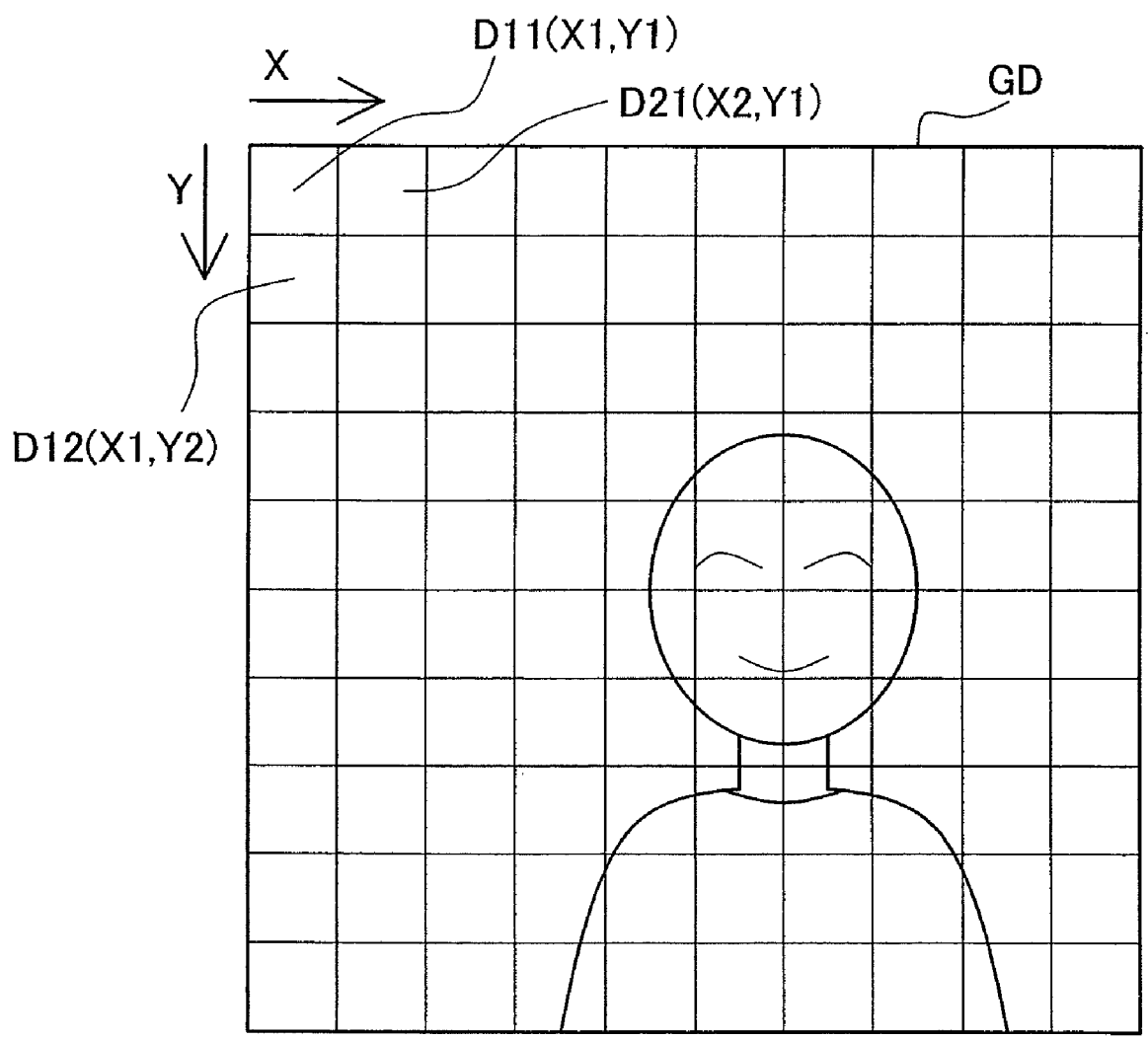
FIG. 7 illustrates a format of image data in the first Embodiment.

The format of image data handled in the first Embodiment shall be described with reference to FIG. 7. FIG. 7 illustrates the format of image data in the first Embodiment. The image data GD is 10×10 pixels, i.e. 100-pixel image data. In order to represent the locations of pixels, the pixels are assigned numbers in ascending order from 1 in the directions indicated by the arrows, where the width direction is denoted as X and the height direction is denoted as Y. Specifically, the pixel D11 at upper left is represented as D11 (X1, Y1). Similarly, the pixel D21 is represented as D21 (X2, Y1), and the pixel D12 is represented as D12 (X1, Y2). The gridlines on the image data GD are provided for ease of identifying the pixels; gridlines are not present on the actual image data.

Figure 8:
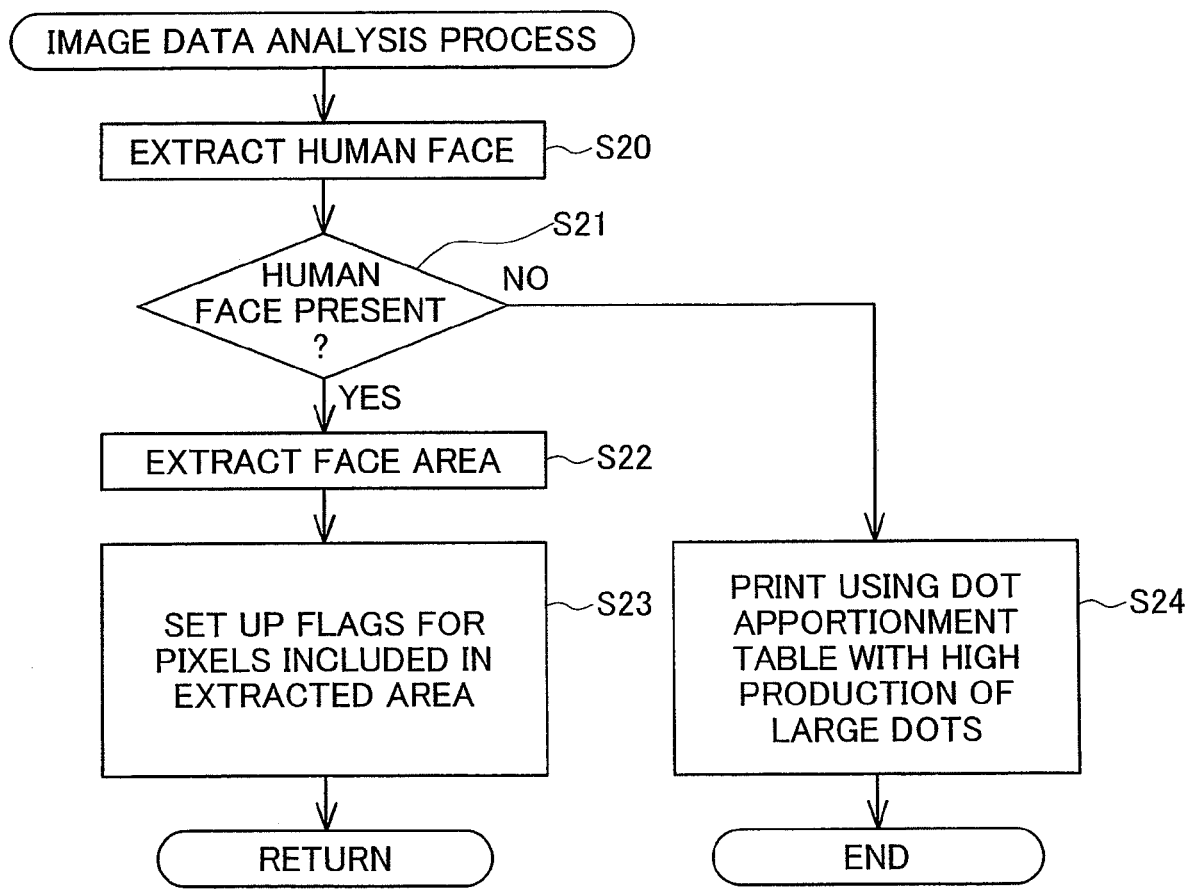
FIG. 8 shows a flowchart of the image data analysis process in the first Embodiment.
Figure 9:
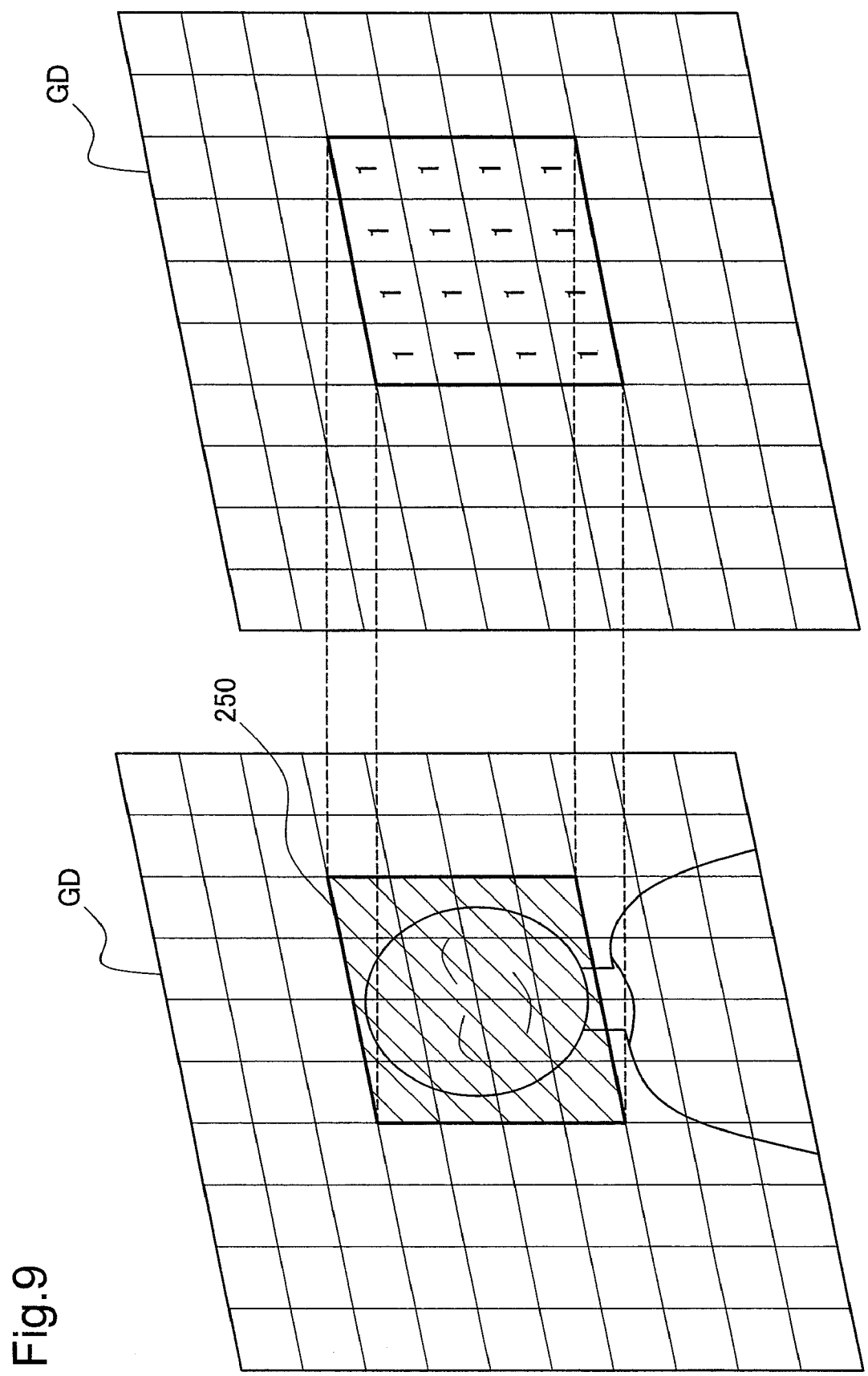
FIG. 9 illustrates a format of extraction of a face region in the first Embodiment.

The image data analysis process in the first Embodiment shall be described referring to FIG. 8 and FIG. 9. FIG. 8 shows a flowchart of the image data analysis process in the first Embodiment. FIG. 9 illustrates the format of extraction of a face region in the first Embodiment. The process in Step S11 in FIG. 6 shall be described in detail with reference to FIG. 8. The printer 22 implements a process to extract a human face (Step S20). The process for extracting the human face may be implemented by methods commonly used, for example, when a given flesh color area is present in the image data, and regions of shape and color that are able to be determined to be eyes and mouth are present within the flesh color area, the area is determined to be a human face.

The printer decides whether a human face has been extracted from the image data GD (Step S21). When a human face has not been extracted (Step S21: NO), the printer 22 prints using a dot apportionment table that has a high production rate of large dots (Step S24). When a human face has been extracted (Step S21: YES), the printer 22 extracts the pixels that compose the human face (Step S22), and sets a face recognition flag for the pixels (Step S23).

The format of the process of Step S23 will be shown with reference to FIG. 9. The area 250 representing the human face in the image data GD is indicated by hatching. The printer 22 set a value of "1" as a face recognition flag for each of the pixels contained in the area 250. The set face recognition flags are stored in a pixel table 300 (see FIG. 11) belonging to the table association module 98 of the printer 22. In the face recognition flags of the pixel table 300, zeros ("0") are stored as the initial values. As shown in FIG. 11, the pixel table 300 is composed of three fields: pixel location, face recognition flag, and dot apportionment table number. The value of the face recognition flag at each pixel location, and the number of the dot apportionment table to be used for ejecting dots at that pixel, are stored.

The printer 22, referring to the pixel table 300, associates of dot apportionment tables with image data GD (Step S12).

Figure 10:
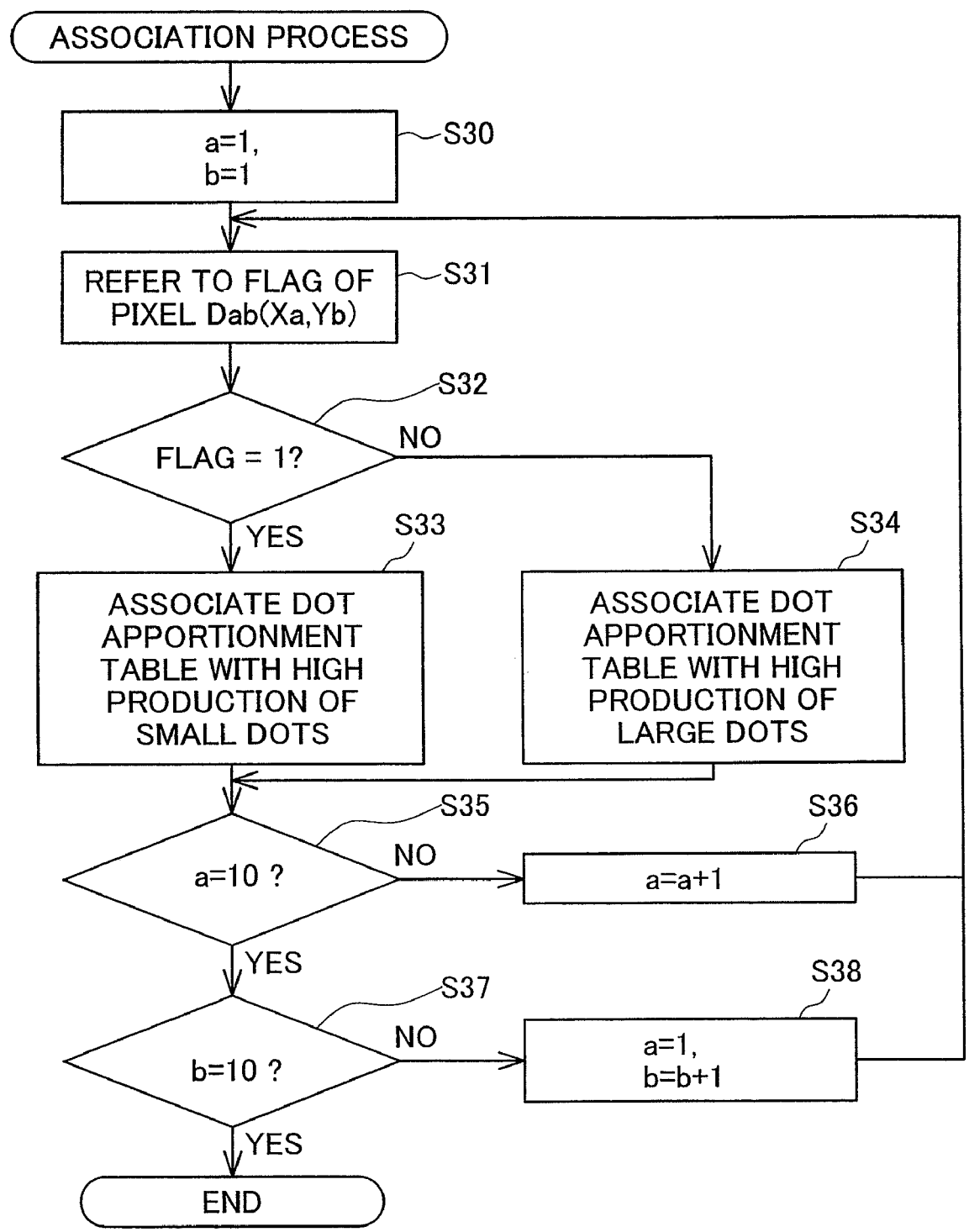
FIG. 10 shows a flowchart of the association process in the first Embodiment.

The association process shall be described in detail with reference to FIG. 10. FIG. 10 is a flowchart depicting the association process in the first Embodiment. It gives the process details of Step S12 in FIG. 6. In the process, two variables, namely variable a and variable b (both positive integers), are used.

The printer 22 assigns a value of 1 to variable a and variable b (Step S30), and refers to the face recognition flag of a pixel Dab (Xa, Xb) stored in the pixel table 300, namely, pixel D11 (X1, Y1) (Step S31). The printer 22 then determines whether the face recognition flag is "1" (Step S32). When the face recognition flag is "1" (Step S32: YES), the printer 22 associates with the pixel a dot apportionment table that has a high production rate of small dots (Step S33). Specifically, the dot apportionment table number "2" of the dot apportionment table 201 that has a high production rate of small dots is stored in the dot apportionment table number field of the pixel table 300.

When the face recognition flag is not "1" (Step S32: NO), the printer 22 associates with the pixel a dot apportionment table that has a high production rate of large dots (Step S34). Specifically, the dot apportionment table number "1" of the dot apportionment table 200 that has a high production rate of large dots is stored in the dot apportionment table number field of the pixel table 300.

The printer 22 determines whether variable an equals 10 (Step S35), and when variable a does not equal 10 (Step S35: NO), increments variable a by 1 (Step S36), and repeats the process starting from Step S31. When the variable a equals 10 (Step S35: YES), the printer 22 then determines whether variable b equals 10 (Step S37).

When variable b does not equal 10 (Step S37: NO), the printer 22 assigns a value of 1 to variable a, increments variable b by 1 (Step S38), returns to Step S31, and repeats the process. When variable b equals 10 (Step S37: YES), the printer 22 decides that dot apportionment table association has been implemented for all pixels, and terminates the process. In the first Embodiment, for purposes of description the process was described using image data GD, so in the processes described in Step S35 and Step S37, determination is made as to whether the variables a, b are equal to 10 or greater; however, association with image data of various pixel counts could instead by accomplished by making the determinations "a=maximum pixel count in width direction?" in Step S35 and "b=maximum pixel count in height direction?" in Step S37.

The pixel table 300 subsequent to the association process shall be described with reference to FIG. 11. FIG. 11 illustrates the pixel table 300 in the first Embodiment. The use of the dot apportionment table assigned the dot apportionment table number "2", namely, dot apportionment table 210, for ejecting ink onto pixel D44 (X4, Y4) is portrayed. As shown in FIG. 11, in the pixel table 300, dot apportionment tables are associated with all of the pixels composing the image data GD.

The printer 22 implements a half-toning process while switching among dot apportionment tables with reference to the pixel table 300, and prints (Step S14).

According to the printer of the first Embodiment described above, an object—namely a "human face"—represented in the image data is able to be extracted, and printing implemented using different dot apportionment tables for the area of the object as opposed to areas other than the object. Accordingly, printing is able to be implemented while using a dot apportionment table that has a high production rate of small dots for the area of the human face, thereby reducing grainy appearance, and using a dot apportionment table that has a high production rate of large dots for areas other than the human face, thereby reducing the occurrence of banding.

B. Second Embodiment

In the first Embodiment discussed above, a human face is extracted; in the second Embodiment, it is determined whether image data represented by image data is an image of a night scene.

B1. Image Analysis Process

Figure 12:
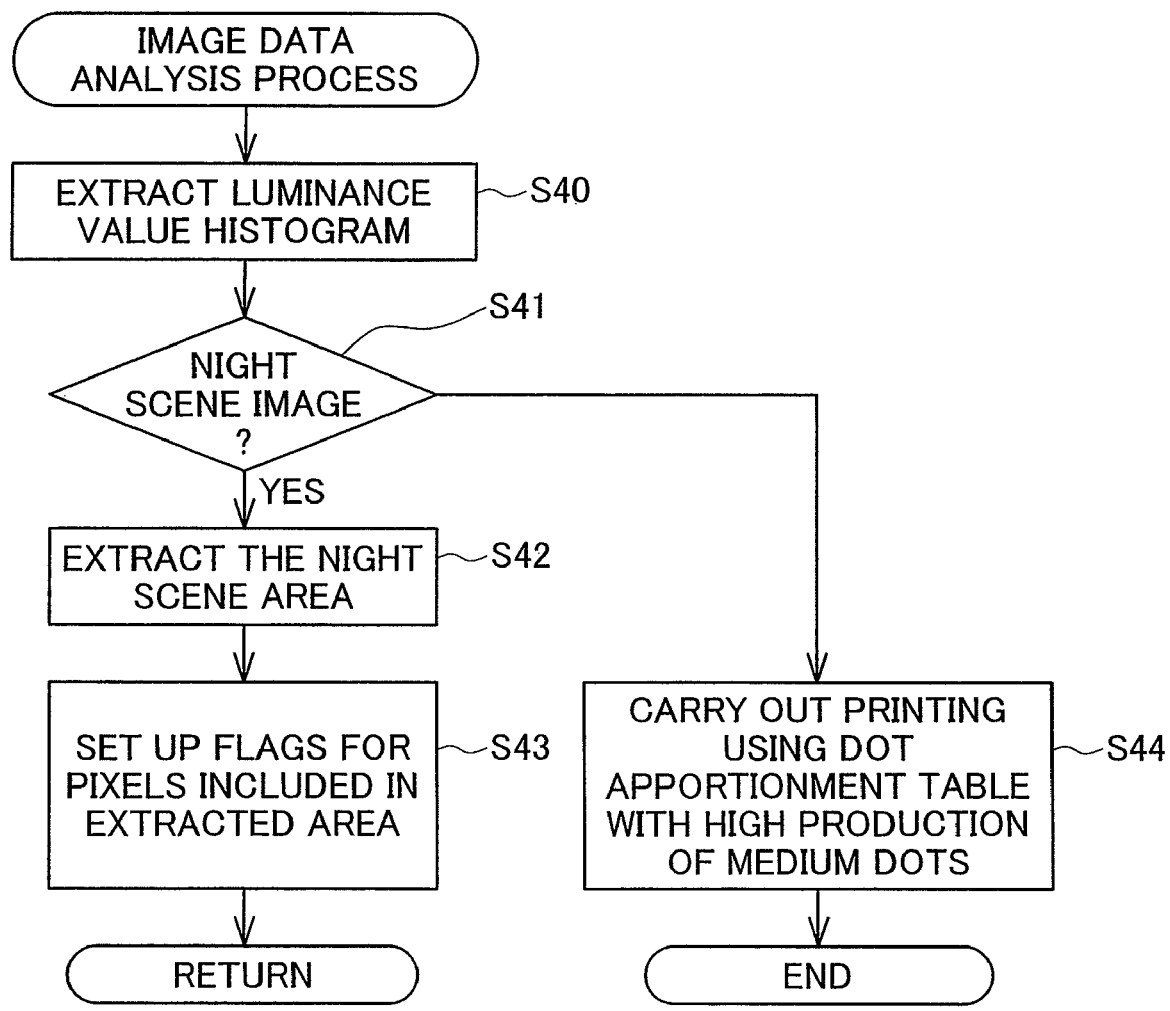
FIG. 12 shows a flowchart of the image data analysis process in the second Embodiment.

The process for determining whether image data is an image of a night scene shall be described with reference to FIG. 12. FIG. 12 shows a flowchart of the image data analysis process in the second Embodiment. FIG. 12 shows in detail the process of Step S11 of FIG. 6. The printer 22 extracts a histogram of the luminance values of the image data (Step S40).

Figure 13:
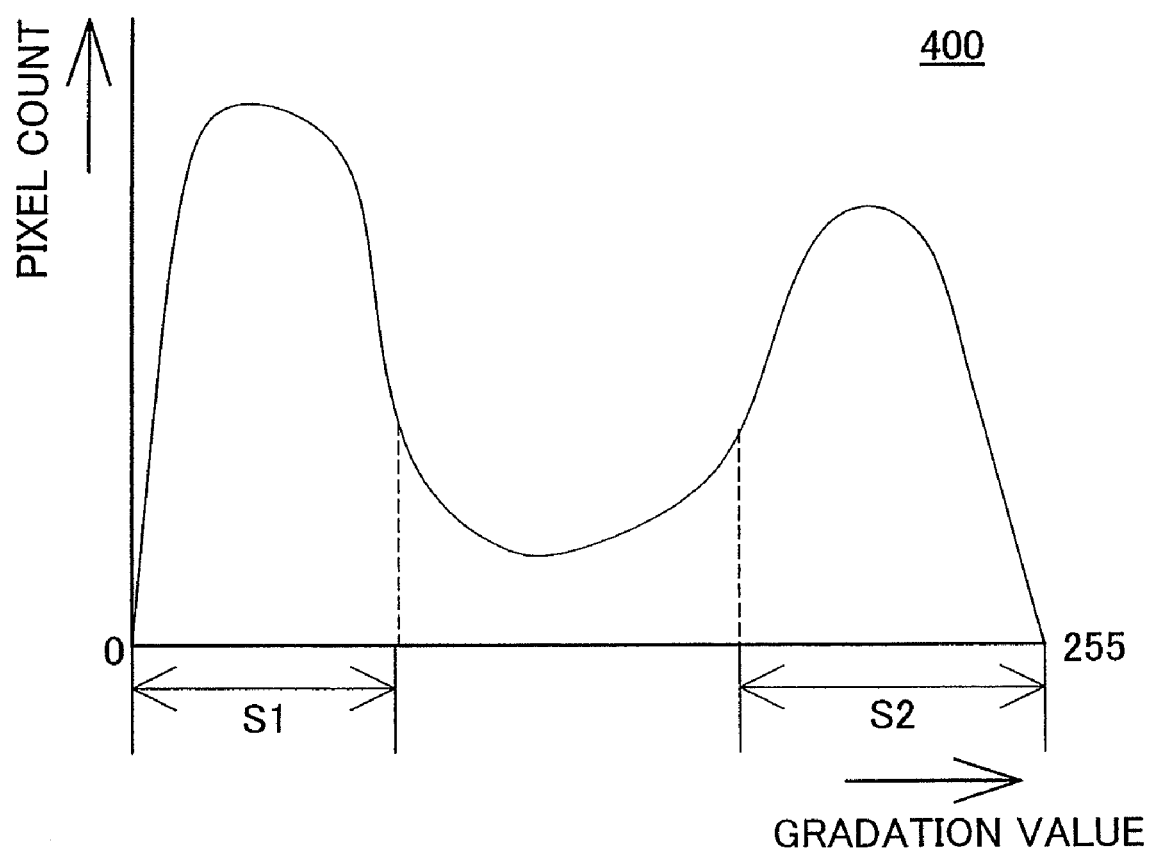
FIG. 13 illustrates an example of a histogram of image data representing a night scene in the second Embodiment.

An example of a histogram of an image of a night scene shall be described with reference to FIG. 13. FIG. 13 illustrates an example of a histogram of image data representing a night scene in the second Embodiment. The histogram 400 consists of tone values, and pixel counts existing at given tone values. As shown in the histogram 400, in the histogram of a night scene, pixels are concentrated in a low tone value range (S1) and a high tone value range (S2). This is because in a night scene, there are scattered lights in the darkness of the night, so that luminance values are concentrated in a low tone value range and a high tone value range. The printer 22 compares, for example, pixel counts in the ranges S1, S2 of the image data being analyzed, with the pixel counts in the ranges S1, S2 of the histogram 400, and where the differential is within a prescribed range, may decide that the image data being analyzed is an image of a night scene.

The printer 22 determines whether the analyzed image data represents a night scene (Step S41), and when the analyzed image data does not represent a night scene (Step S41: NO), prints using a dot apportionment table that has a high production rate of large dots (Step S44). When the analyzed image data represents a night scene (Step S41: YES), the printer 22 extracts the pixels composing the night scene area (Step S42), and sets a night scene recognition flag for the extracted pixels (Step S43).

The subsequent process is similar to the process shown in FIG. 10. However, the process of Step S33 is to "associate with a dot apportionment table that has a high production rate of large dots" and the process of Step S34 is to "associate with a dot apportionment table that has a high production rate of medium dots."

According to this embodiment, printing is able to be implemented using a dot apportionment table that has a high production rate of large dots (e.g. the dot apportionment table 200 shown in FIG. 5A of the first Embodiment), for ejecting ink during printing of pixels included in areas that represent the night scene, while switching dot types between the night scene areas and other areas. Since in many instances, fill-in is important in images of night scenes, large dots are able to be used efficiently for areas represent the night scene.

C. Third Embodiment

In the first Embodiment and the second Embodiment discussed above, printing is implemented by apportioning large dots, medium dots, and small dots. In the third Embodiment, printing is implemented by apportioning dark ink and light ink, rather than dots. In the third Embodiment, in place of the dot apportionment tables in the first Embodiment and the second Embodiment, dark/light ink apportionment tables are used in order to apportion of dark and light ink. The system arrangement of this embodiment is similar to the system arrangement of the first Embodiment. However, dark/light ink apportionment tables are stored in the dot apportionment table storage 50.

C1. Dark/light Ink Apportionment Tables

Figure 14A:
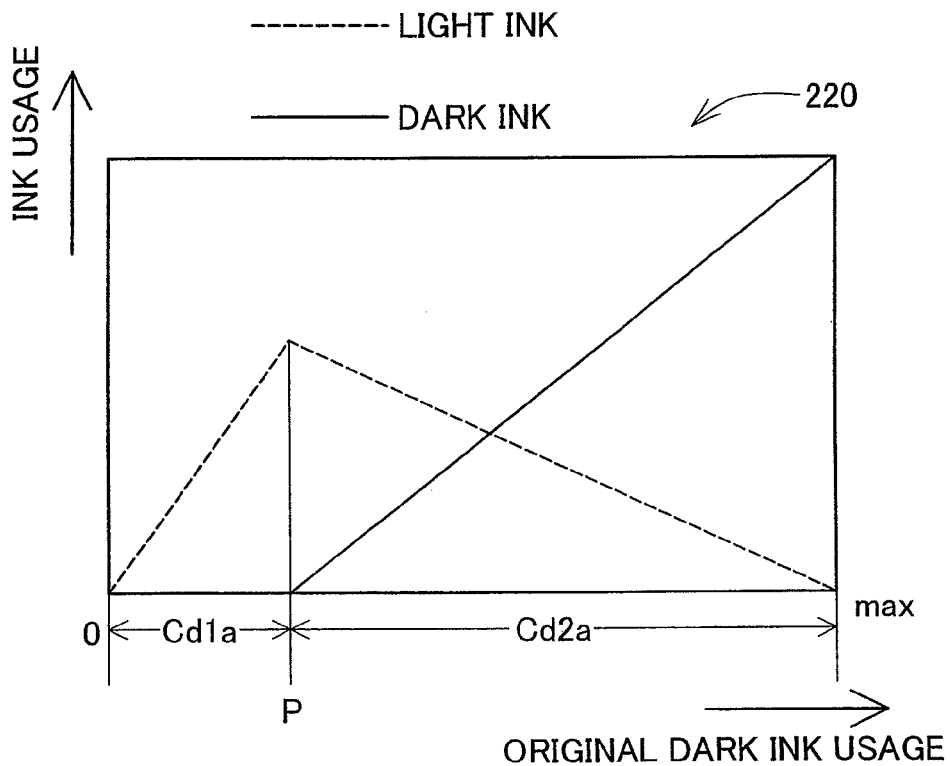
FIG. 14A and FIG. 14B illustrate contents of dark/light apportionment tables in the third Embodiment.
Figure 14B:
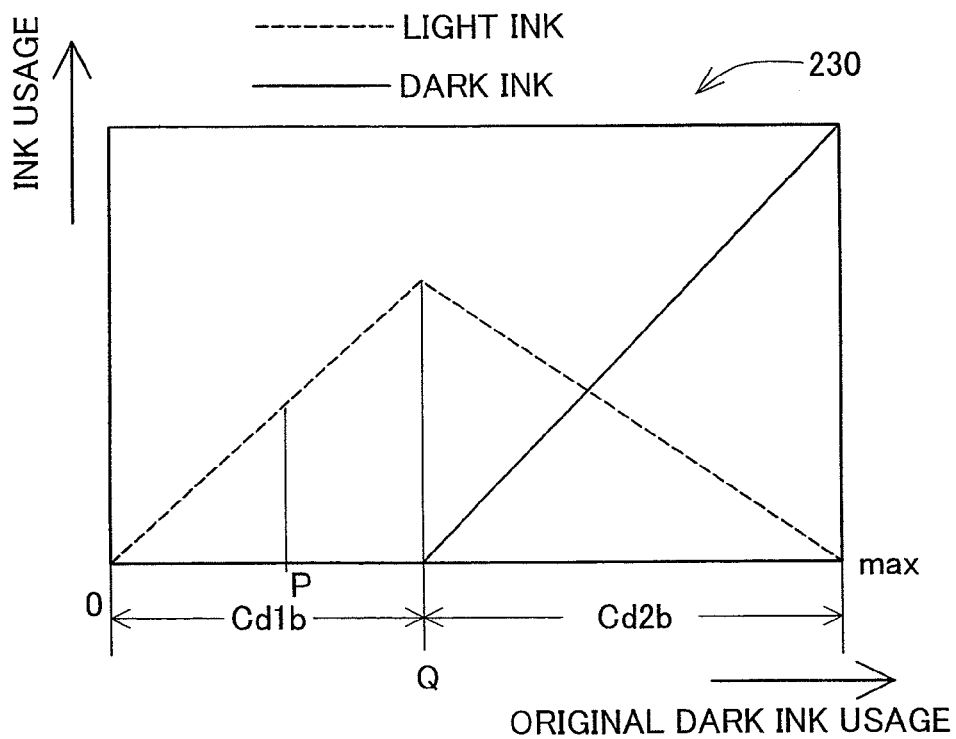

The dark/light ink apportionment tables shall be described with reference to FIG. 14A and FIG. 14B. FIG. 14A illustrates content of a dark/light apportionment table 220 in the third Embodiment. FIG. 14B illustrates content of a dark/light apportionment table 230 in the third Embodiment. The lateral direction of the dark/light ink apportionment tables 220, 230 indicates the usage rate of dark ink needing to be used where printing is implemented with dark ink only, without using light ink (hereinafter, in the third Embodiment, this shall be termed the original dark ink usage rate). The vertical direction of the dark/light ink apportionment tables 220, 230 indicates the usage rate of ink used when reproducing, using both dark ink and light ink, tone values reproduced with original dark ink usage rate. The original dark ink usage rate is determined by the printer driver 96, depending on the tone values of the pixels. In FIG. 14A and FIG. 14B, the broken lines represent light ink usage rate, and the solid lines indicate dark ink usage rate.

The dark/light ink apportionment table 220 represents the fact that only light ink is used in the range Cd1a corresponding to the original dark ink usage rate "0–P." That is, dark ink is not used in the range Cd1a. In the range Cd2a corresponding to the original dark ink usage rate "P–maximum value max" the usable usage rate of light ink decreases, while the usable usage rate of dark ink increases. That is, light ink and dark ink are intermixed, with the proportion of dark ink increasing as the original dark ink level increases.

The dark/light ink apportionment table 230 represents the fact that only light ink is used in the range Cd1b corresponding to the original dark ink usage rate "0–Q." As shown in FIG. 14B, Q>P, and the dark/light ink apportionment table 230 represents dark ink starting to be mixed with light ink, when greater original dark ink usage rate are needed as compared to the dark/light ink apportionment table 220. In the range Cd2b corresponding to the original dark ink usage rate "Q–maximum value max" the usable usage rate of light ink decreases, while the usable usage rate of dark ink increases. The dark/light ink apportionment table 230 shows that printing should be implemented using a high level of light ink, during the printing process of the associated object.

The light ink usage rate is based on the dark ink substitution ratio. For example, where the substitution ratio is "3", when substituting light ink for a dark ink usage rate of "1" is implemented, a light ink usage rate of "3" would be needed. That is, light ink is consumed at a level 3 times that of dark ink.

Since light ink is lighter and does not stand out as much compared to dark ink, when applied to a printing medium, grainy appearance is less than with dark ink. Consequently, by printing while associating the dark/light ink apportionment table 230 with flesh color areas, the printer 22 is able to minimize grainy appearance of flesh color areas.

C2. Printing Process

The printing process implemented using the dark/light ink apportionment tables shall now be described. The printer 22 modifies Step S33 of FIG. 10 (the first Embodiment) to "associate with the dark/light ink apportionment table 230 that uses a high level of light ink," and modifies Step S34 to "associate with the dark/light ink apportionment table 220 that uses a high level of dark ink." By making these modifications, the printer 22 is able to print flesh color areas of image data using the dark/light ink apportionment table 230 that uses a high level of light ink.

According to the printer 22 of the third Embodiment described above, printing is able to be implemented using different dark/light ink apportionment tables for areas of a "human face" object represented in image data, and areas other than this object. Consequently, grainy appearance of human face areas is able to be minimized through the use of high usage rate of light ink, and human face portion in the image printed onto the medium is able to be represented smoothly. For non-face areas, the printer 22 is able to print using the dark/light ink apportionment table 230 that uses a high level of dark ink. Consequently, ink consumption usage rate is able to be reduced, as compared to the case where high usage rate of light ink is used.

D. Variations (1) Alternatively, it may be determined whether pixels having chromaticity included in the flesh color gamut are present in numbers above a prescribed value in the image data, and to establish for such pixels a "flesh color flag" corresponding to the "face recognition flag" of the first Embodiment. This determination process may be implemented readily, for example, by converting the color space of the image data being analyzed from the RGB color space to the La*b* color space, and making the determination based of the chromaticity distribution.

Figure 15:
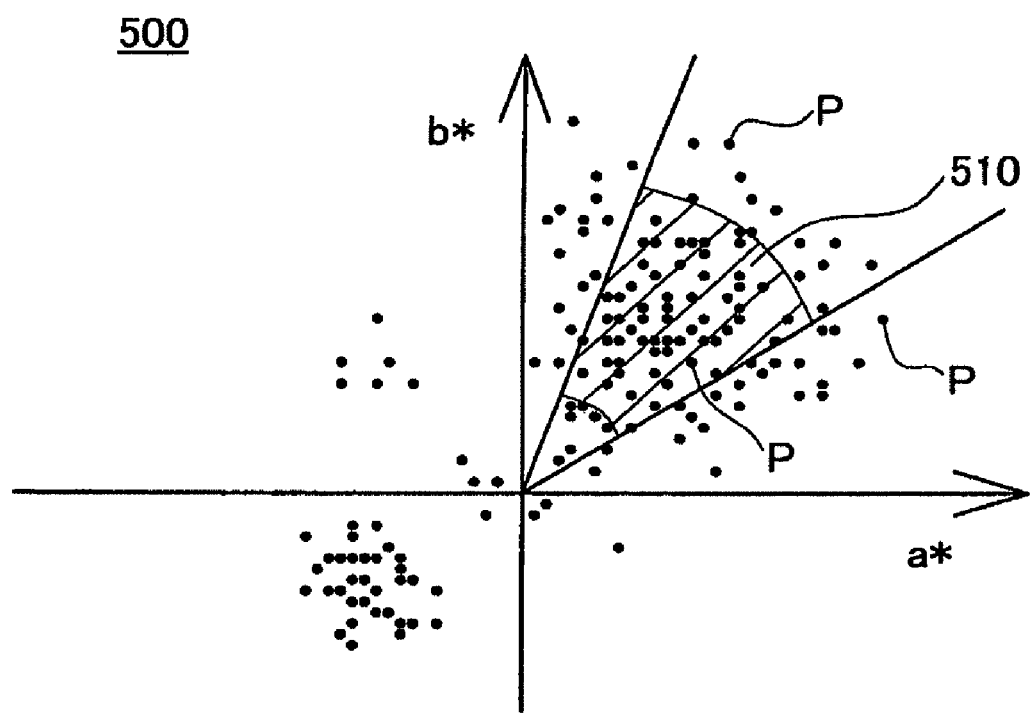
FIG. 15 illustrates an exemplary flesh color tone gamut identification table in a variation.

FIG. 15 illustrates an exemplary flesh color gamut identification table in the variation. A flesh color gamut identification table 500 represents a chromaticity distribution, and is composed of an a* axis and a b* axis. The diagonally hatched area in FIG. 15 is the "flesh color gamut" in this variation. The distribution of the multiple dots P shown in FIG. 15 represents the chromaticity distribution of the pixels composing the image data. By having the printer extract pixels that have chromaticity included in the flesh color gamut, and set up flesh color flags for them, it is a simple matter to extract the flesh color area.

In most cases, pixels having chromaticity included in the flesh color gamut represent a human face, and thus by associating with those pixels for which flesh color flags have been set a dot apportionment table that has a high production rate of small dots, grainy appearance in regions representing flesh color is able to be reduced. Additionally, the process load is able to be lowered and the processing speed improved, as compared to a process of human face recognition.

(2) Prior to the process, described in Variation (1) above, of determining whether pixels having chromaticity included in the flesh color gamut are present in numbers above a prescribed value in the image data, a determination may be made whether or not the shoot mode is portrait mode, by referring to the Exif information of the image data. Exif information is information that stores settings information such as the shooting conditions and resolution of the image data, and is appended to image data at the time that the image data is shot.

Where portrait mode has been used, there is a high likelihood that people will be portrayed in the image represented by the image data. Accordingly, it would be acceptable in such cases to set "flesh color flags" for having chromaticity included in the flesh color gamut, without making a determination as to whether pixels having chromaticity included in the flesh color gamut are present in numbers above a prescribed value.

Figure 16A:
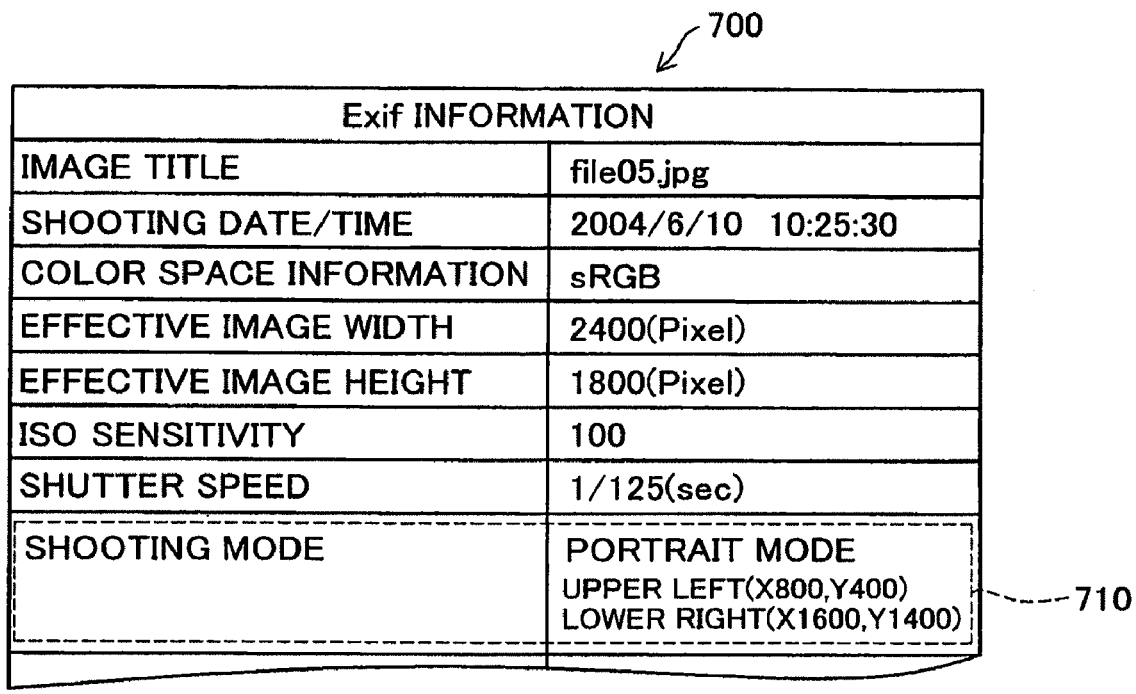
FIG. 16A illustrates an example of Exif information in a variation.

An example of Exif information shall now be described with reference to FIG. 16A. FIG. 16A is an illustration depicting an example of Exif information in this variation. The Exif information contains setting such as the shooting date and time when the image data was taken, color space information, shutter, speed, and shooting mode 710. As shown in FIG. 16A, in the case where image data has been shot in portrait mode, the shooting mode 710 is set to "Portrait mode."

According to this variation, since it is readily able to be determined whether or not people have been photographed in image data, it is possible to efficiently associate a dot apportionment table that has a high production rate of small dots with pixels having flesh color chromaticity. Consequently, processing speed is able to be improved, and grainy appearance in flesh color areas is able to be reduced.

Figure 16B:
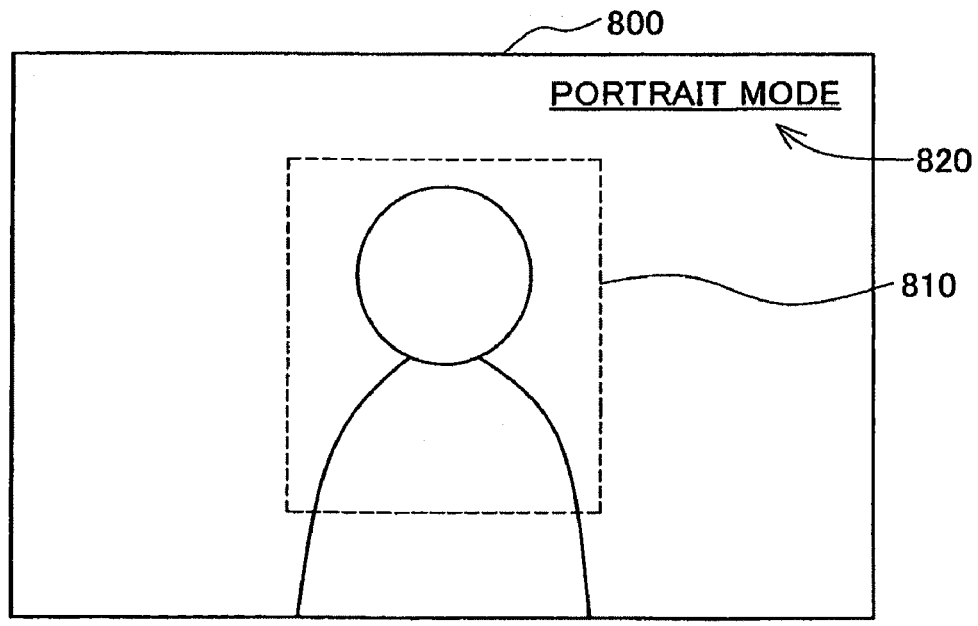
FIG. 16B exemplary illustrates depicting a viewfinder display.

(3) Additionally, where portrait mode has been selected as the shooting mode in the digital camera, it would be acceptable to display within the viewfinder 800 a mode display 820 indicating Portrait mode, and an assist frame 810 providing assistance in positioning of a human subject within the shot, as depicted in FIG. 16B. Where the pixel locations of the assist frame 810 have been stored in the shooting mode 710 as indicated by the Exif information 700 of FIG. 16A, the pixels contained in the area enclosed by the frame 810 is able to be readily recognized. In this variation, as indicated by the Exif information 700, the effective image area width is 2400 pixels, and the effective image area height is 800 pixels; as indicated by the shooting mode 710, the upper left pixel location of the frame 810 is D (X800, Y400), and the lower right pixel location is D (X1600, Y1500). By associating a dot apportionment table that has a high production rate of small dots with the pixels included in the area enclosed by the frame 810, processing speed is able to be improved, since there is no need to determine flesh color areas or face recognition, for example.

(4) In the first Embodiment discussed previously, the dot apportionment tables are described as being stored in advance in the printer 22, but are not limited to this arrangement. For example, the printer may have a table representing usage rate proportions of small dots, medium dots, and large dots, depending on gamut, and a table storing information regarding the volume of each dot type, e.g. 1 ng for a small dot, 4 ng for a medium dot, and 10 ng for a large dot, with dot apportionment tables being calculated appropriately on the basis of the usage rate proportion of each dot type and the volume of each dot type.

(5) In the first Embodiment discussed previously, 20 dot apportionment tables are stored in the dot apportionment table storage 50, but it would be possible also to store more than 20, or fewer than 20. A larger number of dot apportionment tables enables flexible selection of dot apportionment tables, and is able to afford further improvement in picture quality. A fewer number of dot apportionment tables is able to improve processing speed.

(6) In the printing system of the first Embodiment discussed previously, the printer 22 obtains image data from the digital camera 10 via the memory card 30, but it not limited to this arrangement. For example, the printing system may be constituted using a personal computer with a printer driver installed on it. In this case, assuming that the personal computer and the printer are connected locally or over a network, printing is able to be accomplished by execution of a print command from the personal computer. User friendliness is able to be improved thereby, since printing is able to be implemented after having implemented image processing of various kinds, using an image processing application preinstalled on the personal computer.

(7) In the first Embodiment and the second Embodiment discussed previously, dot apportionment tables are associated with pixels, but it would be possible to instead associate dot apportionment tables with a target identified as a result of analyzing an image, for example, a human face or a night scene area. In such cases, the target area is able to be identified readily by extracting a simple shape, for example a rectangle, and acquiring the pixel locations at two points, i.e. the upper left and lower right, of the rectangular area. Consequently, there is no need to associate dot apportionment tables with all of the pixels contained in the extracted target area, so the processing load is able to be reduced.

While the invention has been shown and described hereinabove through certain preferred embodiments, the invention is not limited to the embodiments taught herein, and is able to take various other forms without departing from the spirit thereof.

The Japanese patent applications indicated hereinbelow on which the claim of priority right of the present application rests are incorporated herein by reference.

(1) Japanese Unexamined Patent Application 2005-65773 (filing date 2005.3.9)
(2) Japanese Unexamined Patent Application 2006-37673 (filing date 2006.2.15)

What is claimed is:

1. An image processing system comprising:
an image processing apparatus; and
a digital camera,
wherein the digital camera comprises:
a display that displays a particular subject;
a display controller that indicates an assist frame providing assistance in positioning of a human subject within the display in case that portrait mode is selected as a shooting mode for setting a shooting conditions; and
a generating module that shoots the particular subject in the selected shooting mode and generates image data, and appends pixel locations information of the assist frame in the image data to the image data, and
wherein the image processing apparatus comprises:
an image data acquirer configured to acquire image data and the appended pixel locations information of the assist frame;
a table obtainer configured to obtain a dot apportionment table that has a high production rate of small size dots with the pixels included in the area enclosed by the assist frame based on the appended pixel locations information of the assist frame and at least one other dot apportionment table for the pixels not included in the area enclosed by the assist frame; and
a printing module configured to generate dot data using the obtained dot apportionment tables, wherein the dot data indicates dot size to be formed on a print medium.

2. The image processing device according to claim 1, wherein the display controller indicates the selected shooting mode information in the display.

3. The image processing system in accordance with claim 2, wherein the image processing apparatus is a printer that includes at least two types of ink and a head, wherein the head is capable of forming at least two types of dots of different sizes on the print medium.

4. The image processing system in accordance with claim 3, wherein the printing module is further configured to print an image by forming dots on the print medium according to the generated dot date.

5. The image processing system in accordance with claim 1, further comprising:
a table storage configured to store at least two dot apportionment tables; and wherein the table obtainer obtains the dot apportionment tables from the table storage.

6. The image processing system in accordance with claim 1, wherein the image processing apparatus is a printer that includes at least two types of ink and a head, wherein the head is capable of forming at least two types of dots of different sizes on the print medium.

7. The image processing system in accordance with claim 6, wherein the printing module is further configured to print an image by forming dots on the print medium according to the generated dot date.

* * * * *